US007502764B2

(12) United States Patent
Son et al.

(10) Patent No.: US 7,502,764 B2
(45) Date of Patent: Mar. 10, 2009

(54) METHOD FOR DECIDING ARRAY SPACING OF ARRAY ANTENNA BY USING GENETIC ALGORITHM AND ARRAY ANTENNA HAVING SOFA STRUCTURE WITH IRREGULAR ARRAY SPACING

(75) Inventors: Seong-Ho Son, Pusan (KR); Ung-Hee Park, Daejon (KR); Soon-Ik Jeon, Daejon (KR); Chang-Joo Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 415 days.

(21) Appl. No.: 11/027,933

(22) Filed: Dec. 30, 2004

(65) Prior Publication Data

US 2009/0012768 A1 Jan. 8, 2009

(30) Foreign Application Priority Data

May 13, 2004 (KR) ..................... 10-2004-0033926

(51) Int. Cl.

| | |
|---|---|
| ***G06F 7/60*** | (2006.01) |
| ***G06F 15/18*** | (2006.01) |
| ***G06N 3/00*** | (2006.01) |
| ***G06N 3/12*** | (2006.01) |
| ***H01Q 3/24*** | (2006.01) |
| ***H01Q 1/00*** | (2006.01) |
| ***H01Q 15/02*** | (2006.01) |

(52) U.S. Cl. ............................ 706/13; 703/2; 343/876; 343/905; 343/911 R; 375/304; 375/315

(58) Field of Classification Search ..................... 703/2; 342/375, 379; 324/446; 343/905, 876, 911 R; 706/13; 375/304, 315

See application file for complete search history.

(56) References Cited

U.S. PATENT DOCUMENTS 3,868,695 A * 2/1975 Kadak ........................ 343/778

(Continued)

FOREIGN PATENT DOCUMENTS

JP 04-196904 7/1992

(Continued)

OTHER PUBLICATIONS

Eric A. Jones and William T. Joines. "Design of Yagi-Uda Antennas Using genetic Algorithms." Sep. 1997, IEEE Transactions on Antennas and Propagation, vol. 45, No. 9.*

(Continued)

*Primary Examiner*—David R Vincent
*Assistant Examiner*—Ben M Rifkin
(74) *Attorney, Agent, or Firm*—Blakely, Sokoloff, Taylor & Zafman

(57) ABSTRACT

A method for determining an array space of an array antenna by using a genetic algorithm and an array antenna having a soft structure with irregular array spacing are disclosed. The array antenna having a sofa structure with irregular array spacing, includes: a plurality of radiation elements having an inclined angle based on a horizontal plane and arranged with irregular array spacing for radiating and receiving an radio wave; a plurality of phase shifters for amplifying radiation signals radiated from the plurality of radiation elements and receiving signals received from the plurality of radiation elements, and controlling phases of the radiation signals and the receiving signals; and a radio wave signal coupler for dividing a transmitting signal to the radiation signals, transferring the divided radiation signals to the plurality of phase shifters and coupling the receiving signals from the plurality of phase shifters.

8 Claims, 5 Drawing Sheets

U.S. PATENT DOCUMENTS

| | | | | |
|---|---|---|---|---|
| 5,325,102 | A * | 6/1994 | Page | 342/375 |
| 5,774,690 | A | 6/1998 | O'Neill | |
| 2004/0051667 | A1 | 3/2004 | Ro et al. | |

FOREIGN PATENT DOCUMENTS

| | | |
|---|---|---|
| JP | 2002-164736 | 6/2002 |
| KR | 2000-0056336 | 9/2000 |
| KR | 2001-0108546 | 12/2001 |
| KR | 10-2004-0025113 | 3/2004 |

OTHER PUBLICATIONS

Eric A. Jones and William T. Joines. "Design of Yagi-Uda Antennas Using genetic Algorithms." Sep. 1997, IEEE Transactions on Antennas and Propagation, vol. 45, No. 9. pp. 1-7.*

Suppressive Effect of Grating Lobes by Triangular Array Antenna, 2001 Summer Workshop Collection of Papers, vol. 1, pp. 823-826, Jul. 2001.

Thinned Arrays Using Genetic Algorithms, IEEE Transactions on Antennas Propagation, vol. 42, No. 7, pp. 993-999, Jul. 1994.

Low-Sidelobe Pattern Synthesis of Spherical Arrays Using a Genetic Algorithm, Microwave and Optical Technology Letters, vol. 32, No. 6, pp. 412-414, Mar. 2002.

* cited by examiner

METHOD FOR DECIDING ARRAY SPACING OF ARRAY ANTENNA BY USING GENETIC ALGORITHM AND ARRAY ANTENNA HAVING SOFA STRUCTURE WITH IRREGULAR ARRAY SPACING

FIELD OF THE INVENTION

The present invention relates to a method for determining an array space of an array antenna by using a genetic algorithm and an array antenna having a sofa structure with irregular array spacing; and, more particularly, to a method for determining an array space of an array antenna by using a genetic algorithm for having an optimized low sidelobe characteristics and an array antenna having a sofa structure with irregular array spacing having the optimized low sidelobe characteristics.

DESCRIPTION OF RELATED ARTS

Generally, an array antenna is an active phase array antenna capable of electronic beam steering and is widely used for mobile communication, satellite communication and radar.

However, a conventional array antenna may generate unnecessary sidelobe such as a greating lobe by an array space between unit elements. The generated high level sidelobe causes to transmit or to receive to/from unwanted directions. Therefore, the unexpectedly generated sidelobe degrades a performance of the array antenna.

The conventional array antenna generally has a rectangular structure with regular array spacing. For suppressing the grating lobe in the rectangular structure with the regular array spacing, a space between array elements is determined base on following equation.

$$\frac{D}{\lambda} = \frac{1}{1 + |\sin\theta_0|} \qquad \text{Eq. 1}$$

In Eq. 1, D is a space between array elements, $\lambda$ is a wave length, and $\theta_0$ is electronic beam steering angle.

As mentioned above, the space between array elements must be designed to satisfy the Eq. 1 for suppressing the sidelobe in the conventional array antenna. However, it is actually very difficult that an array antenna is manufactured to satisfy the Eq. 1 because of various structural reasons of the array antenna.

Particularly, in an array antenna having a sofa structure, a radio wave shadowing is generated at rear array element by front array element.

Accordingly, there has been demanding a method for suppressing the sidelobe although a space between array elements is designed to satisfy Eq. 1. Therefore, an array antenna having a triangle array spacing structure has been introduced.

The array antenna having the triangle array spacing structure can reduce a sidelobe level and provides wider allowable array spacing comparing to the array antenna with the rectangular array spacing structure.

However, there is a limitation for realizing an array antenna having the optimized sidelobe based on the triangle array spacing structure because the triangle array spacing structure is also based on the regular array spacing. That is, array elements in the triangle array spacing structure are arranged within an identical array space.

FIG. 1 is a diagram showing a conventional flat linear array antenna.

As shown in FIG. 1, the conventional flat linear array antenna includes a plurality of radiation elements 100, a plurality of phase shifters 105 and a radio wave signal coupler 110.

The radiation elements 100 are arranged with a regular space d 120. The radiation elements 100 are connected to the phase shifters 105 in a one-to-one manner through coaxial cables A1 to An. Also, the phase shifters 105 are connected to the radio wave signal coupler 110 through coaxial cables B1 to Bn.

The radiation elements 100 receives the radio wave signals and the radio wave signal coupler 110 couples the received radio wave signals from the radiation elements 100 through the phase shifters 105. The phase shifter 105 control phases of the received radio wave signals for forming an antenna beam to an arrival angle θ 130. The above mentioned method for forming the antenna beam is also implemented for transmitting the radio wave signals.

In the above mentioned conventional array antenna having regular array spacing, the space between array elements could not be narrowed because of structural reasons of the radiation unit element. Therefore, high level of sidelobe is unexpectedly generated.

Furthermore, the conventional array antenna having regular array spacing basically steers the antenna beam to a direction of receiving or transmitting the radio wave. Therefore, if the conventional array antenna receives or transmits the radio wave to an inclined direction, the antenna beam must to be steered to the inclined direction. In this case, a steering loss is generated by steering the antenna beam and the steering loss causes to decrease an antenna gain.

SUMMARY OF THE INVENTION

It is, therefore, an object of the present invention to provide a method for determining a array space of an array antenna by using a genetic algorithm in order to arrange radiation elements within a space to have the optimized low sidelobe characteristics while maintaining minimum space preventing an radio wave shadowing generated at a rear sub array by a front sub array, and an array antenna with a sofa structure with irregular array spacing.

In accordance with an aspect of the present invention, there is also provided an array antenna having a sofa structure with irregular array spacing, including: a plurality of radiation elements having an inclined angle based on a horizontal plane and arranged with irregular array spacing for radiating and receiving an radio wave; a plurality of phase shifters for amplifying radiation signals radiated from the plurality of radiation elements and receiving signals received from the plurality of radiation elements, and controlling phases of the radiation signals and the receiving signals; and a radio wave signal coupler for dividing a transmitting signal to the radiation signals, transferring the divided radiation signals to the plurality of phase shifters and coupling the receiving signals from the plurality of phase shifters.

In accordance with another aspect of the present invention, there is also provided a method for determining array spaces of an array antenna by using a genetic algorithm, the method including the steps of: a) generating a random chromosome population for chromosomes describing location information representing array spaces between the radiation means; b) calculating an antenna beam pattern for each chromosome in the generated random chromosome population; c) analyzing a sidelobe fitness according to the calculated beam pattern; d) determining whether there is a chromosome having the analyzed fitness satisfying a predetermined reference value; e)

deciding the array space as a value of the chromosome satisfying the predetermined reference value when there is the chromosome satisfying the predetermined reference value; and f) generating new random chromosome population by using a selection step, a crossover step and a mutation step when there is not a chromosome having the analyzed fitness satisfying the predetermined reference value, and repeatedly performing the step a) to the step f).

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, a method for determining an array space of an array antenna by using a genetic algorithm and an array antenna having a sofa structure with irregular array spacing in accordance with a preferred embodiment of the present invention will be described in more detail with reference to the accompanying drawings.

Figure 1:
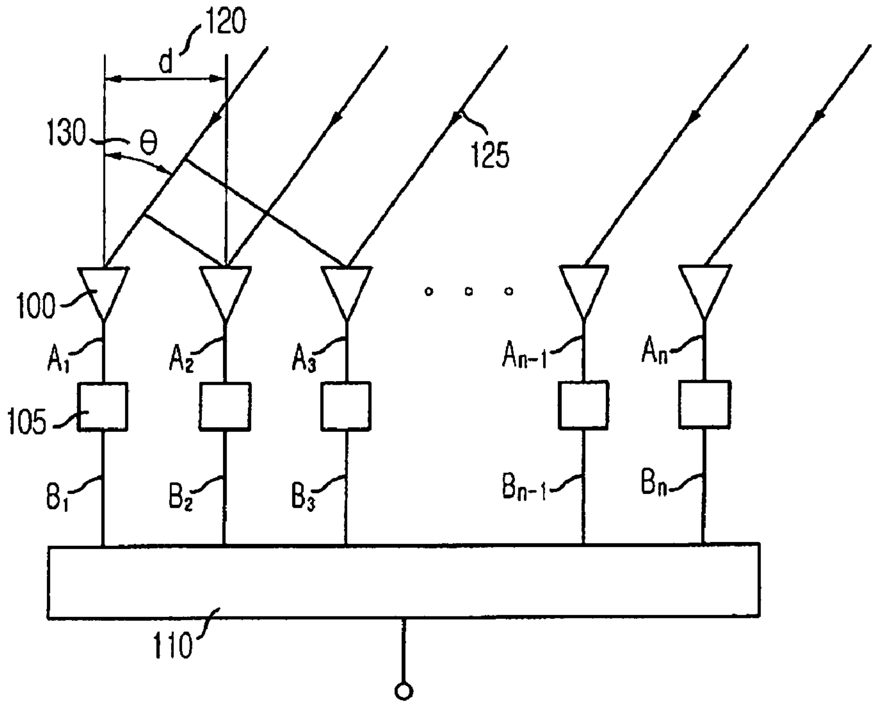
FIG. 1 (Prior Art)
FIG. 1 is a diagram showing a conventional flat linear array antenna.
Figure 2:
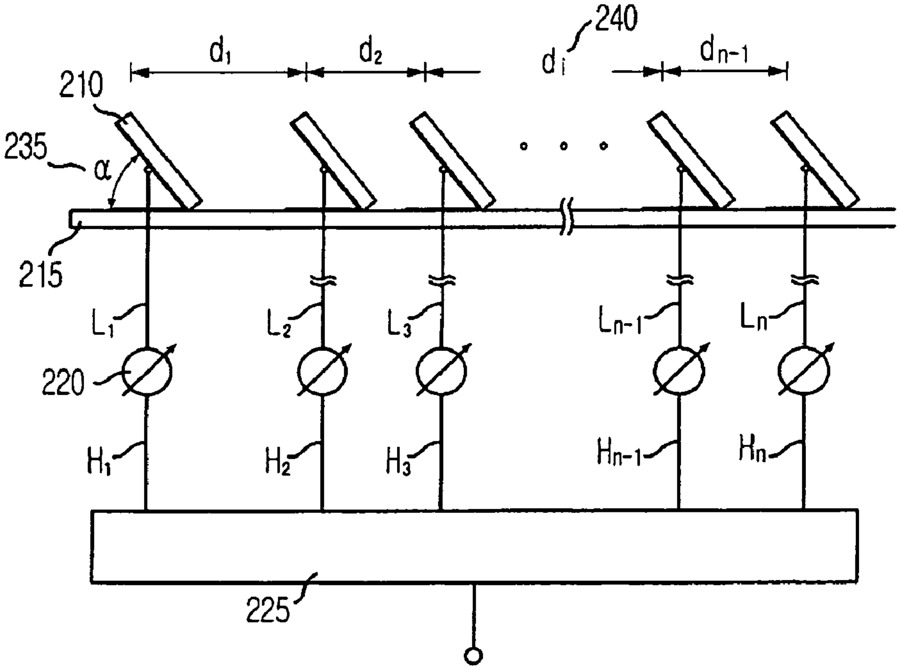
FIG. 2 is a diagram illustrating an array antenna having a sofa structure with irregular array spacing in accordance with a preferred embodiment of the present invention.

FIG. 2 is a diagram illustrating an array antenna having a sofa structure with irregular array spacing in accordance with a preferred embodiment of the present invention.

As shown in FIG. 2, a radiation sub array 210 of the array antenna having a sofa structure with irregular array spacing forms a soft structure having a constant steering angle α 235 based on a fixed surface 214.

In more detail, the array antenna having a sofa structure with irregular array spacing includes: a radiation sub array 210 having a plurality of radiation elements for radiating and receiving an radio wave signal by arranging the radiation elements with irregular spaces and having the constant steering angle α 235 based on the fixed surface 215; a plurality of phase shifter 220 for amplifying radiation signals radiated from the radiation sub array 210 and receiving signals received from the radiation sub array 210, and controlling phases of the radiation signals radiated from the radiation sub array 210 and phases of the receiving signals received from the radiation sub array 210; and an radio wave signal coupler 225 for dividing a transmitting signal into the radiation signals, transferring the radiation signals to a plurality of the phase shifters 220 and coupling the receiving signals from a plurality of the phase shifters 220.

The radiation elements of the radiation sub array 210 are arranged within irregular spaces d1 to dn−1 at the fixed surface 215. The radiation elements of the radiation sub array 210 are connected to the phase shifters 220 in one-to-one manner through coaxial cables L1 to Ln, and the phase shifters 220 are connected to the radio wave signal coupler 210 through coaxial cables H1 to Hn.

For adjusting an initial phase of a radio wave signal before steering an antenna electronic beam, lengths of the coaxial cables L1 to Ln and H1 to Hn are determined by below equation.

$$L_1 + H_1 = L_0 \qquad \text{Eq. 2}$$

$$L_i + H_i = L_0 + \left(\sum_{m=1}^{i-1} d_m \cdot \sin\alpha\right) \Big/ \sqrt{\varepsilon_r}, \; (2 \le i \le n)$$

In Eq. 2, $L_l$ is a minimum length of the coaxial cable and $\in_r$ is a dielectric constant of the coaxial cable.

In a conventional phase array antenna, a phase is controlled by using a phase shifter for the initial phase control which adjusts a phase of a radio wave before steering an electronic beam of the antenna while using same length of coaxial cables connected to radiation elements.

However, the conventional phase control method by using the phase shifter is not appropriate to be implemented for a wideband multi-radio wave transceiving system that simultaneously transmits/receives various frequencies since a phase is controlled according to frequencies of radio waves.

Therefore, by controlling lengths of coaxial cables according to Eq. 2, the initial phase can be adjusted without regarding to frequency of radio wave signals. Accordingly, the present invention can be used for the wideband multi-radio wave transceiving.

Figure 3:
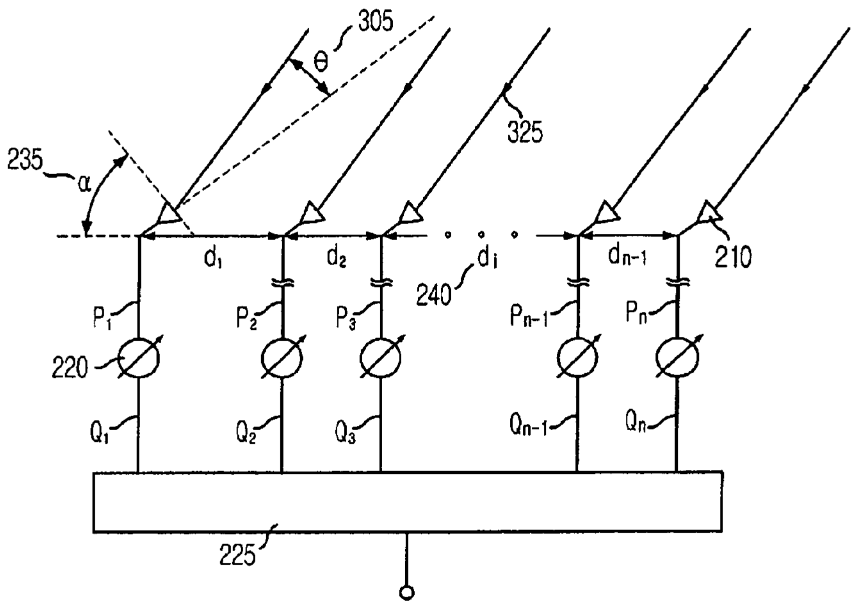
FIG. 3 is a diagram showing an array antenna having a sofa structure with irregular array spacing in accordance with a preferred embodiment of the present invention.

FIG. 3 is a diagram showing an array antenna having a sofa structure with irregular array spacing in accordance with a preferred embodiment of the present invention.

As shown in FIG. 3, when the radiation sub array 210 receives a radio wave in an electric arrival angle θ 305 based on an angle 235 which is currently steered by the radiation sub array 210, the antenna beam is steered to the electric arrival angle θ 305.

The antenna beam steering is performed based on controlling a phase of radio wave by each phase shifter 220.

For example, when a phase is α angle inclined based on a horizontal plane, a direction angle of the radiation sub array is controlled to be α angle. Therefore, an antenna gain loss caused by the antenna beam steering can be prevented.

And, by irregularly arranging spaces d1 to dn−1 of the radiation sub array, the sidelobe can be suppressed. Suppressing of the sidelobe will be explained by referring to FIGS. 5 and 6 later.

Figure 4:
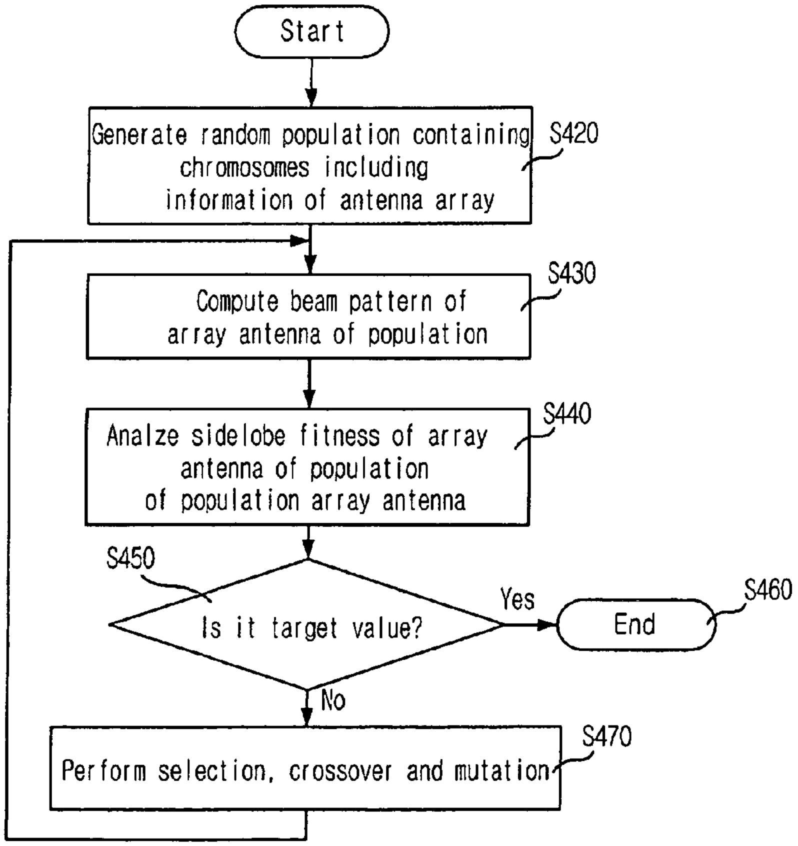
FIG. 4 is a flowchart showing a genetic algorithm for determining optimized irregular array spacing in accordance with a preferred embodiment of the present invention.

FIG. 4 is a flowchart showing a genetic algorithm for determining optimized irregular array spacing in accordance with a preferred embodiment of the present invention.

As shown in FIG. 4, a random chromosome population is generated for a chromosome including information about spaces d1 to dn−1 of the radiation sub array 210 at step S420.

Inhere, the chromosome represents the information about the spaces as a sequence of binary number 0 and 1 at step S430.

A beam pattern of the array antenna of each chromosome in the generated chromosome population is calculated at step S430.

After calculating the beam patterns, a sidelobe fitness of each calculated beam pattern is analyzed at step S450.

The sidelobe fitness is analyzed in reverse proportion to the sidelobe level. That is, the sidelobe fitness becomes decrease as increasing the sidelobe level at all area excepting an antenna main beam.

As a result of analyzing, if the result is not a target result, new chromosome is generated by performing a selection step, a crossover step and a mutation step at step S470 and then the step S430 is repeatedly performed.

If the result is the target result, the method is terminated at step S460.

Hereinafter, by referring to FIGS. 5 to 7, variation of sidelobe is explained according to cases of regular array spacing, irregular array spacing and performing a beam steering under assumptions that the number of radiation elements in the radiation sub array of the array antenna having sofa structure is 14, a sub array pattern is omni-directional and an antenna transmitting frequency is 14.25 GHz.

Figure 5:
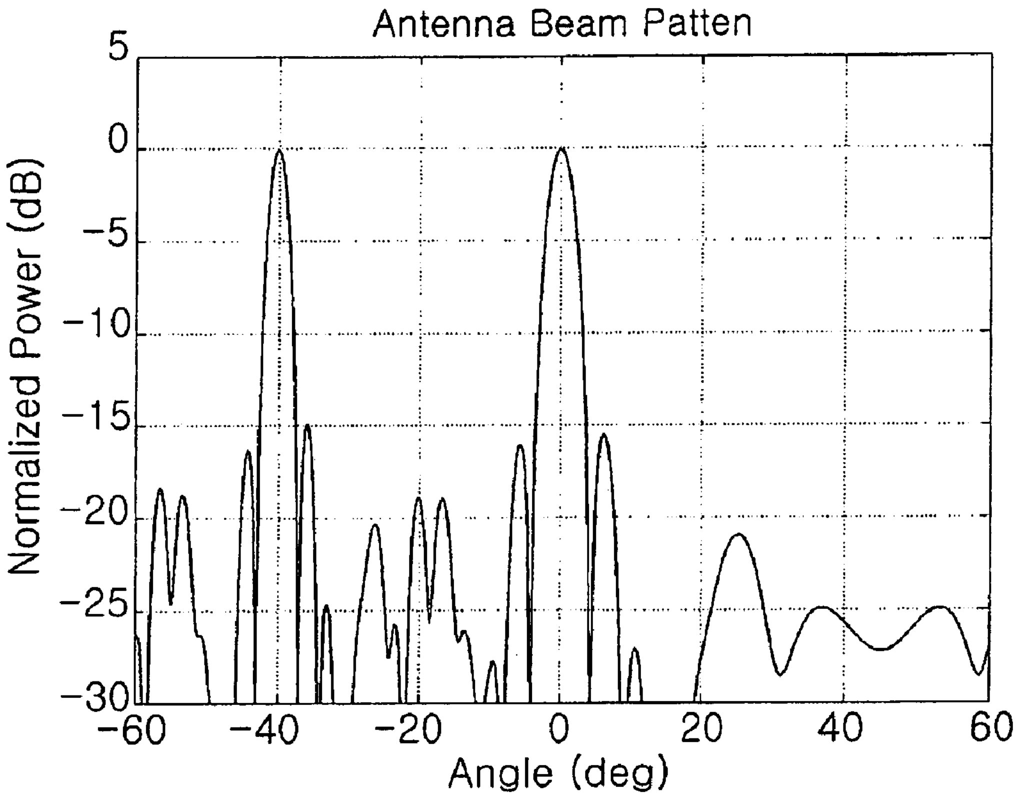
FIG. 5 is a graph showing a forward radiation pattern of an array antenna having a sofa structure with regular array spacing.

FIG. 5 is a graph showing a forward radiation pattern of an array antenna having a sofa structure with regular array spacing. That is, FIG. 5 shows the forward radiation pattern of the array antenna having radiation elements arranged within 34.94 mm of regular array space.

In here, it assumes that 34.94 mm of the array space is minimum space size for preventing generation of radio wave shadowing at a rear sub array by a front sub array, and the array space cannot be narrowed less than 34.94 mm.

As shown in FIG. 5, the antenna greating lobe is generated at −40 degree and a size of the antenna greating lobe identical to a size of the main lobe.

Also, the greating lobe is generally moved with steering of the main beam in the conventional array antenna.

Figure 6:
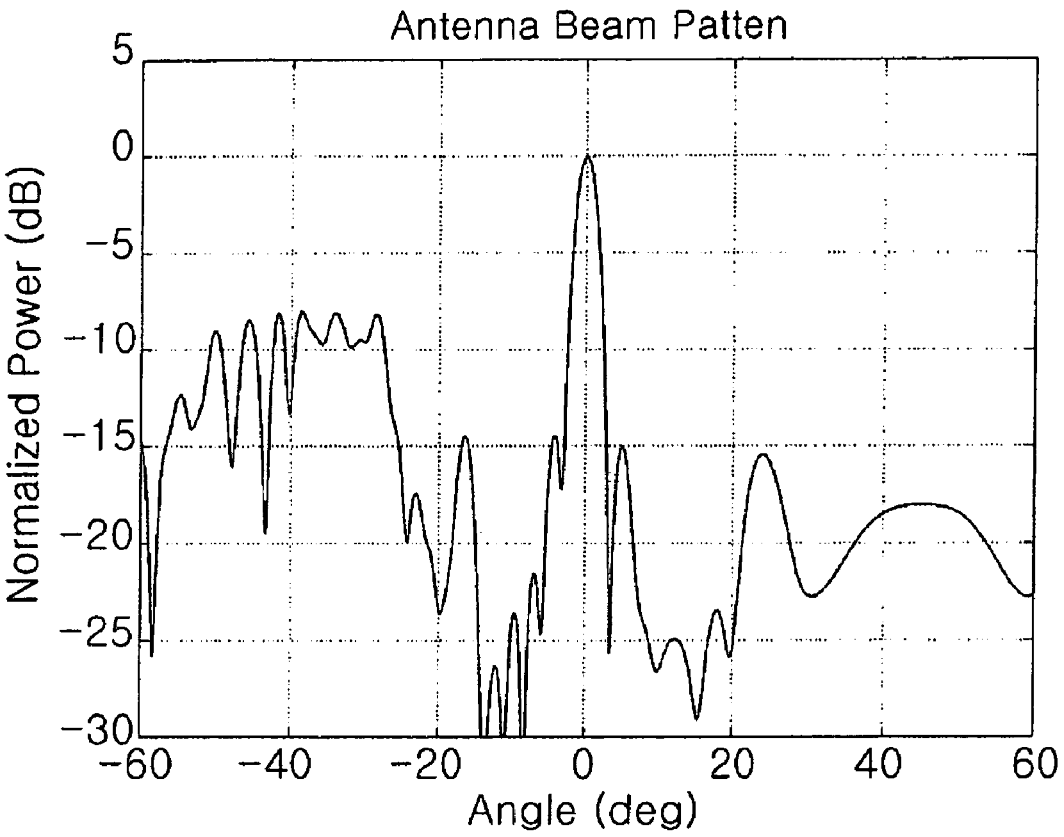
FIG. 6 is a graph showing a forward radiation pattern of an array antenna having a sofa structure with irregular array spacing in accordance with a present invention.

FIG. 6 is a graph showing a forward radiation pattern of an array antenna having a sofa structure with irregular array spacing in accordance with a present invention.

Array spaces d1 to dn are 53.34 mm, 50.10 mm, 54.31 mm, 43.96 mm, 52.69 mm, 34.26 mm, 52.04 mm, 33.95 mm, 42.34 mm, 36.53 mm, 33.94 mm, 33.94 mm and 33.94 mm, respectively.

The above mentioned array spaces are obtained based on the genetic algorithm shown in FIG. 4.

As shown in FIG. 6, the greating lobe of FIG. 5 is not found in FIG. 6 and the sidelobe is suppressed more than 8 dB.

Figure 7:
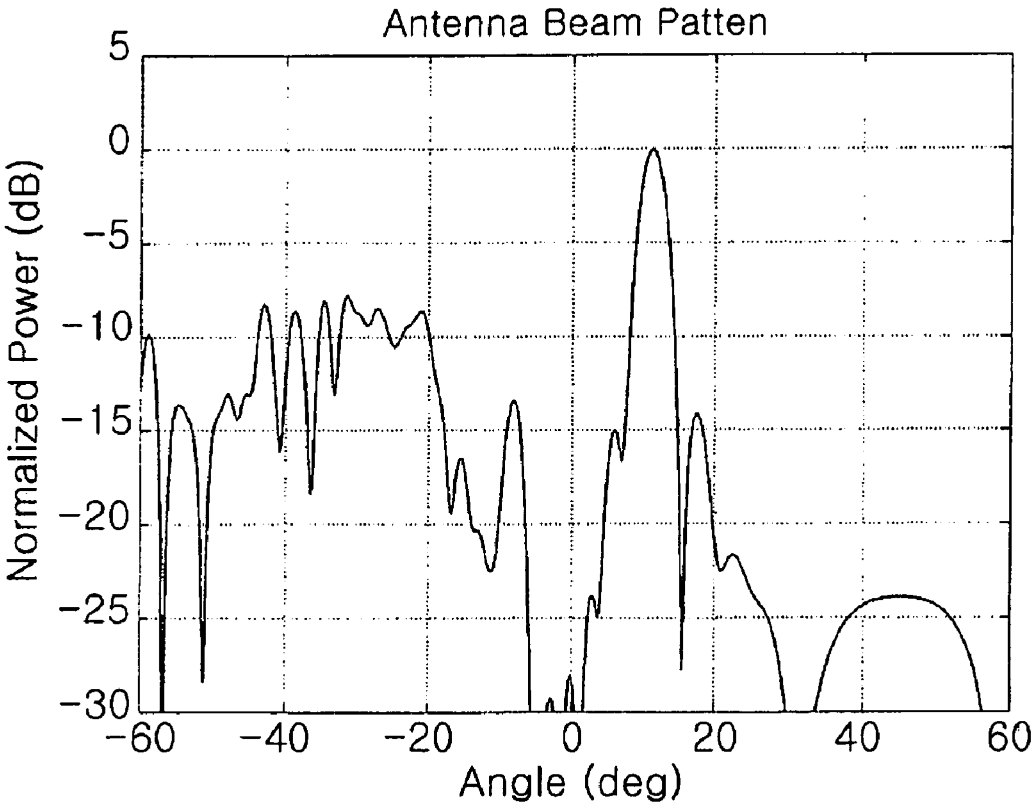
FIG. 7 is a graph showing a 10 degree steered radiation pattern of an array antenna having a sofa structure with irregular array spacing in accordance with a present invention.

FIG. 7 is a graph showing a 10 degree steered radiation pattern of an array antenna having a sofa structure with irregular array spacing in accordance with a present invention.

Conventionally, the greating lobe of an array antenna with regular array spacing is moved with steering of to main beam. However, in the array antenna having a sofa structure with irregular array spacing, the sidelobe does not increase although the antenna beam is steered as shown in FIG. 7.

As mentioned above, the array antenna having the sofa structure with irregular array spacing of the present invention can have optimized low sidelobe characteristics by wider irregular array spacing when an array space cannot be narrowed because of structural reasons.

Also, the sidelobe of the present invention is not influenced by the electronic beam steering.

Furthermore, because the sidelobe of the present invention is not influenced by the electronic beam steering, the present invention can be implemented to a low sidelobe phase array antenna used for communication to a satellite located in an inclined direction and receiving a broadcasting signal and a radar system.

Moreover, the present invention can be implemented to a wideband multi antenna since the present invention adjusts an initial phase of the antenna by controlling a length of a coaxial cable without regarding to a frequency of radio wave.

The present application contains subject matter related to Korean patent application No. 10-2004-0033926, filed in the Korean patent office on May 13, 2004, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. An array antenna having a sofa structure with irregular array spacing, comprising:

a plurality of radiation means having an inclined angle based on a horizontal plane and arranged with irregular array spacing for radiating and receiving an radio wave;

a plurality of phase shifting means for amplifying radiation signals radiated from the plurality of radiation means and receiving signals received from the plurality of radiation means, and controlling phases of the radiation signals and the receiving signals; and radio wave signal coupling means for dividing a transmitting signal to the radiation signals, transferring the divided radiation signals to the plurality of phase shifting means and coupling the receiving signals from the plurality of phase shifting means, wherein the radiation means are connected to the radio wave signal coupling means through a plurality of coaxial cables, and each of the coaxial cables having a predetermined length determined based on an array space between a $m^{th}$ radiation means and a $(m+1)^{th}$ radiation means, the inclined angle of the radiation means and a dielectric constant of the coaxial cable, where m is an integer equal to or larger than 1, wherein the predetermined length of each of the coaxial cables is decided by an equation $$L_i + H_i = L_0$$

$$L_i + H_i = L_0 + \left(\sum_{m=1}^{i-1} d_m \cdot \sin\alpha\right) \Big/ \sqrt{\varepsilon_r}\,,\ (2 \le i \le n)$$

where $L_i+H_i$ is a length of the coaxial cable between an $i^{th}$ radiation means to the radio wave coupling means, $L_0$ is a minimum length, $d_m$ is an array space between a $m^{th}$ radiation means and a $(m+1)^{th}$ radiation means, $\alpha_m$ is an inclined angle and $\in_r$ is a dielectric constant of the coaxial cable.

2. The array antenna having a sofa structure with irregular array spacing as recited in claim 1, wherein the array space between the radiation means is determined by a genetic algorithm.

3. The array antenna having a sofa structure with irregular array spacing as recited in claim 2, wherein the genetic algorithm:

generates a random chromosome population for chromosomes describing location information representing array spaces between the radiation means;

calculates an antenna beam pattern for each chromosome in the generated random chromosome population;

analyzes a sidelobe fitness according to the calculation result of the beam pattern; and determines whether there is a chromosome having the analyzed fitness satisfying a predetermined reference value, decides the array space as a value of the chromosome satisfying the predetermined reference value when there is the chromosome satisfying the predetermined reference value, and generates new random chromosome population by using a selection step, a crossover step and a mutation step when there is not a chromosome having the analyzed fitness satisfying the predetermined reference value, and repeatedly performs the generation step, the calculation step, the analyzing step and the determining step.

4. The array antenna having a sofa structure with irregular array spacing as recited in claim 3, wherein the chromosome is described as a sequence of binary numbers 0 and 1 representing the location information of the radiation means.

5. A method for determining array spaces of an array antenna by using a genetic algorithm, the method performed by a computer comprising the steps of:

a) generating a random chromosome population for chromosomes describing location information representing array spaces between radiation means, wherein the radiation means are connected to a radio wave signal coupling means through a plurality of coaxial cables, and each of the coaxial cables having a predetermined length determined based on an array space between a $m^{th}$ radiation means and a $(m+1)^{th}$ radiation means, an inclined angle of the radiation means and a dielectric constant of the coaxial cable, where m is an integer equal to or larger than 1, the predetermined length of each of the coaxial cables is decided by an equation $$L_i + H_i = L_0$$

$$L_i + H_i = L_0 + \left(\sum_{m=1}^{i-1} d_m \cdot \sin\alpha\right) \Big/ \sqrt{\varepsilon_r}\,,\ (2 \le i \le n)$$

where $L_i+H_i$ is a length of the coaxial cable between an $i^{th}$ radiation means to the radio wave coupling means, $L_0$ is a minimum length, $d_m$ is an array space between a $m^{th}$ radiation means and a $(m+1)^{th}$ radiation means, $\alpha_m$ is an inclined angle and $\in_r$ is a dielectric constant of the coaxial cable;

b) calculating an antenna beam pattern for each chromosome in the generated random chromosome population;

c) analyzing a sidelobe fitness according to the calculated beam pattern;

d) determining whether there is a chromosome having the analyzed fitness satisfying a predetermined reference value;

e) deciding the array space as a value of the chromosome satisfying the predetermined reference value when there is the chromosome satisfying the predetermined reference value; and f) generating new random chromosome population by using a selection step, a crossover step and a mutation step when there is not a chromosome having the analyzed fitness satisfying the predetermined reference value, and repeatedly performing the step a) to the step f).

6. The method as recited in claim 5, wherein the chromosome is described as a sequence of binary numbers 0 and 1 representing the location information of the radiation means.

7. The method as recited in claim 6, wherein in the step c), the sidelobe fitness decreases as increasing maximum sidelobe at all area excepting an antenna main beam.

8. The method as recited in claim 7, wherein the array antenna is an array antenna having a sofa structure.

* * * * *